(12) United States Patent
Kawase et al.

(10) Patent No.: US 12,005,959 B2
(45) Date of Patent: Jun. 11, 2024

(54) BODY OF VEHICLE

(71) Applicants: TOYOTA JIDOSHA KABUSHIKI KAISHA, Toyota (JP); SUBARU CORPORATION, Tokyo (JP)

(72) Inventors: Kyosuke Kawase, Okazaki (JP); Satoshi Ikeda, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 155 days.

(21) Appl. No.: 17/705,590

(22) Filed: Mar. 28, 2022

(65) Prior Publication Data

US 2022/0315112 A1 Oct. 6, 2022

(30) Foreign Application Priority Data

Apr. 5, 2021 (JP) ................................ 2021-064160

(51) Int. Cl.
*B62D 21/15* (2006.01)
*B62D 25/20* (2006.01)

(52) U.S. Cl.
CPC ............ *B62D 21/15* (2013.01); *B62D 25/20* (2013.01); *B62D 21/157* (2013.01); *B62D 25/2018* (2013.01); *B62D 25/2027* (2013.01); *B62D 25/2036* (2013.01); *B62D 25/2045* (2013.01)

(58) Field of Classification Search
CPC ...... B62D 21/15; B62D 25/20; B62D 21/157; B62D 25/2018; B62D 25/2027; B62D 25/2036; B62D 25/2045

USPC .................................................. 296/187.09
See application file for complete search history.

(56) References Cited

U.S. PATENT DOCUMENTS

| 9,873,457 | B2 | 1/2018 | Onishi |
| 9,896,131 | B2 | 2/2018 | Onishi |
| 2019/0232773 | A1 | 8/2019 | Kasai et al. |
| 2019/0382053 | A1* | 12/2019 | Natsume ................ B62D 25/20 |

FOREIGN PATENT DOCUMENTS

| CN | 207875788 U | 9/2018 |
| DE | 102015005801 A1 | 11/2016 |
| FR | 3093984 A1 | 9/2020 |
| JP | 63-11217 U | 1/1988 |
| JP | 06-144299 A | 5/1994 |
| JP | 08-119152 A | 5/1996 |
| JP | 2002-154459 A | 5/2002 |
| JP | 2007-112173 A | 5/2007 |
| JP | 2016-078539 A | 5/2016 |

(Continued)

OTHER PUBLICATIONS

Office Action Issued To JP 2021-064160, dated Nov. 2, 2023.

*Primary Examiner* — Amy R Weisberg
*Assistant Examiner* — Dana D Ivey
(74) *Attorney, Agent, or Firm* — Dinsmore & Shohl LLP (57) ABSTRACT

A body includes a center tunnel that extends in a front-rear direction of a vehicle, a floor panel that extends from the center tunnel to both sides of the vehicle in a right-left direction, a floor cross member that is provided on an upper face of the floor panel and that extends in the right-left direction of the vehicle, straddling the center tunnel, and a reinforcing member joined to an upper face of the center tunnel and to a front face of the floor cross member.

7 Claims, 4 Drawing Sheets

(56) References Cited

FOREIGN PATENT DOCUMENTS

| JP | 2016078539 A | * | 5/2016 | ............. | B62D 25/20 |
| JP | 2019-130978 A | | 8/2019 | | |
| JP | 6600873 B2 | * | 11/2019 | ............. | B62D 25/20 |

* cited by examiner

BODY OF VEHICLE

CROSS-REFERENCE TO RELATED APPLICATION

This application claims priority to Japanese Patent Application No. 2021-064160 filed on Apr. 5, 2021, incorporated herein by reference in its entirety.

BACKGROUND

1. Technical Field

The technology disclosed in the present specification relates to a body of a vehicle.

2. Description of Related Art

Japanese Unexamined Patent Application Publication No. 2019-130978 (JP 2019-130978 A) discloses a body of a vehicle. The body is provided with a center tunnel extending in a front-rear direction of the vehicle, a floor panel extending from the center tunnel to both sides in a right-left direction of the vehicle, and a floor cross member extending in the right-left direction of the vehicle, as well as being provided on an upper face of the floor panel. The center tunnel straddles the floor cross member and extends in the front-rear direction of the vehicle.

SUMMARY

The shape of the center tunnel is reflected in the shape of a cabin floor face. With regard to the aforementioned body, there is demand to lower the height of the center tunnel, in order to improve comfort within the cabin. When the vehicle encounters a collision from a direction forward of the vehicle (i.e., a frontal collision), the center tunnel absorbs the collision load. Accordingly, configuring the center tunnel to be low for the purpose of improving comfort within the cabin reduces the bending rigidity of the center tunnel around the lateral axis of the vehicle. Accordingly, when the collision load due to the frontal collision is applied to the center tunnel, a front end of the center tunnel may exhibit bending deformation in an upward direction. In particular, when the floor cross member extends in the right-left direction of the vehicle with straddling the center tunnel, the aforementioned bending deformation of the center tunnel tends to occur with a joining position between an upper face of the center tunnel and a front face of the floor cross member as a starting point of the bending deformation.

The present specification provides technology capable of suppressing bending deformation of the center tunnel.

A body disclosed in the present specification includes a center tunnel that extends in a front-rear direction of the vehicle, a floor panel that extends from the center tunnel to both sides of the vehicle in a right-left direction, a floor cross member that is provided on an upper face of the floor panel and that extends in the right-left direction of the vehicle, straddling the center tunnel, and a reinforcing member joined to an upper face of the center tunnel and to a front face of the floor cross member.

In the body described above, the reinforcing member is joined to the upper face of the center tunnel and the front face of the floor cross member. According to such a configuration, a collision load applied to the center tunnel in a frontal collision is dispersed to the floor cross member through the reinforcing member. Thus, the collision load applied to the center tunnel is reduced, and accordingly the center tunnel can be suppressed from exhibiting bending deformation around the lateral axis.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the present technology, a reinforcing member may be a plate-shaped member that is joined to an upper face of a center tunnel on a first side and is joined to a front face of a floor cross member on a second side. According to such a configuration, the reinforcing member can efficiently transmit a collision load received from the center tunnel to the floor cross member. That is to say, bending deformation of the center tunnel can be suppressed even more effectively.

In one embodiment of the present technology, of the upper face of the center tunnel, at least a range located above the floor cross member may be an inclined face that inclines downward from forward to rearward. The reinforcing member may be joined to the inclined face of the center tunnel. In an arrangement in which the upper face of the center tunnel is an inclined face, a front end of the center tunnel tends to exhibit bending deformation in an upward direction when a collision load due to frontal collision is applied to the center tunnel. Accordingly, the present technology can be suitably adopted for such a configuration.

In one embodiment of the present technology, a body may further include a tunnel reinforcement that extends in a front-rear direction of a vehicle and that is provided on a lower face of the center tunnel. According to such a configuration, bending rigidity of the center tunnel around the lateral axis is improved. Thus, bending deformation of the center tunnel can be suppressed even more effectively.

In one embodiment of the present technology, the tunnel reinforcement may include a forward tunnel reinforcement, and a rearward tunnel reinforcement located rearward from the forward tunnel reinforcement. An overlap portion, in which the forward tunnel reinforcement and the rearward tunnel reinforcement overlap each other, may be provided downward from the floor cross member. According to such a configuration, rigidity of the portion that serves as a starting point of bending deformation of the center tunnel is selectively increased. Thus, bending deformation of the center tunnel can be suppressed even more effectively.

In one embodiment of the present technology, a front end of the reinforcing member may face the overlap portion on either side of the center tunnel. According to such a configuration, a collision load applied to the center tunnel can be dispersed to the cross member through the overlap portion of the tunnel reinforcement, before being dispersed to the cross member through the reinforcing member. Also, the position of the front end of the reinforcing member can be suppressed from becoming the starting point of bending deformation of the center tunnel. Thus, bending deformation of the center tunnel can be suppressed even more effectively.

In one embodiment of the technology, a rigidity of the forward tunnel reinforcement may be higher than that of the rearward tunnel reinforcement. When the tunnel reinforcement is divided into the forward tunnel reinforcement and the rearward tunnel reinforcement, each of the reinforcements can be provided with rigidity necessary thereto as appropriate. In particular, by increasing the rigidity of the forward tunnel reinforcement, bending deformation of the center tunnel due to a collision load from the forward direction can be effectively suppressed.

In the above-described embodiment, a yield strength of a material making up the forward tunnel reinforcement may be higher than that of a material making up the rearward tunnel reinforcement. According to such a configuration, the yield strength in bending deformation around the lateral axis of the forward tunnel reinforcement is improved, and the bending deformation of the center tunnel can be suppressed even more effectively. On the other hand, by adopting a material having a relatively low yield strength as the material making up the rearward tunnel reinforcement, for example, labor and costs for manufacturing the vehicle can be reduced.

In one embodiment of the technology, the yield strength of the material making up the forward tunnel reinforcement may be higher than that of a material making up the center tunnel. That is to say, in some embodiments, a material having a high yield strength for the forward tunnel reinforcement is selectively adopted, rather than to the entire center tunnel. According to such a configuration, the yield strength of the center tunnel can be effectively improved in the range in which bending deformation is expected around the lateral axis.

In the present specification, expressions simply such as forward, rearward, and front-rear directions mean the forward, rearward, and front-rear directions of the vehicle, respectively. In the same way, expressions simply such as rightward, leftward, and right-left directions mean the rightward, leftward, and right-left directions of the vehicle, respectively, and expressions simply such as upward, downward, and up-down directions mean the upward, downward, and up-down directions of the vehicle. For example, when the vehicle is disposed on a horizontal plane, the up-down direction of the vehicle agrees with the vertical direction. Also, the right-left direction of the vehicle is a direction that is parallel to the horizontal plane and parallel to the axles of the vehicle, and the front-rear direction of the vehicle is a direction that is parallel to the horizontal plane and perpendicular to the axles of the vehicle.

A vehicle 10 according to an embodiment will be described with reference to the drawings. The vehicle 10 is a so-called automobile, and is a vehicle that travels over a road surface. Here, a direction FR in the drawings indicates forward in the front-rear direction of the vehicle 10, and a direction RR indicates rearward in the front-rear direction of the vehicle 10. Also, a direction LH indicates leftward in the right-left direction of the vehicle 10, and a direction RH indicates rightward in the right-left direction of the vehicle 10. Also, a direction UP indicates upward in the up-down direction of the vehicle 10, and a direction DW indicates downward in the up-down direction of the vehicle 10. Note that in the present specification, the front-rear direction of the vehicle 10, the right-left direction of the vehicle 10, and the up-down direction of the vehicle 10, may be referred to simply as the front-rear direction, the right-left direction, and the up-down direction, respectively.

Figure 1:
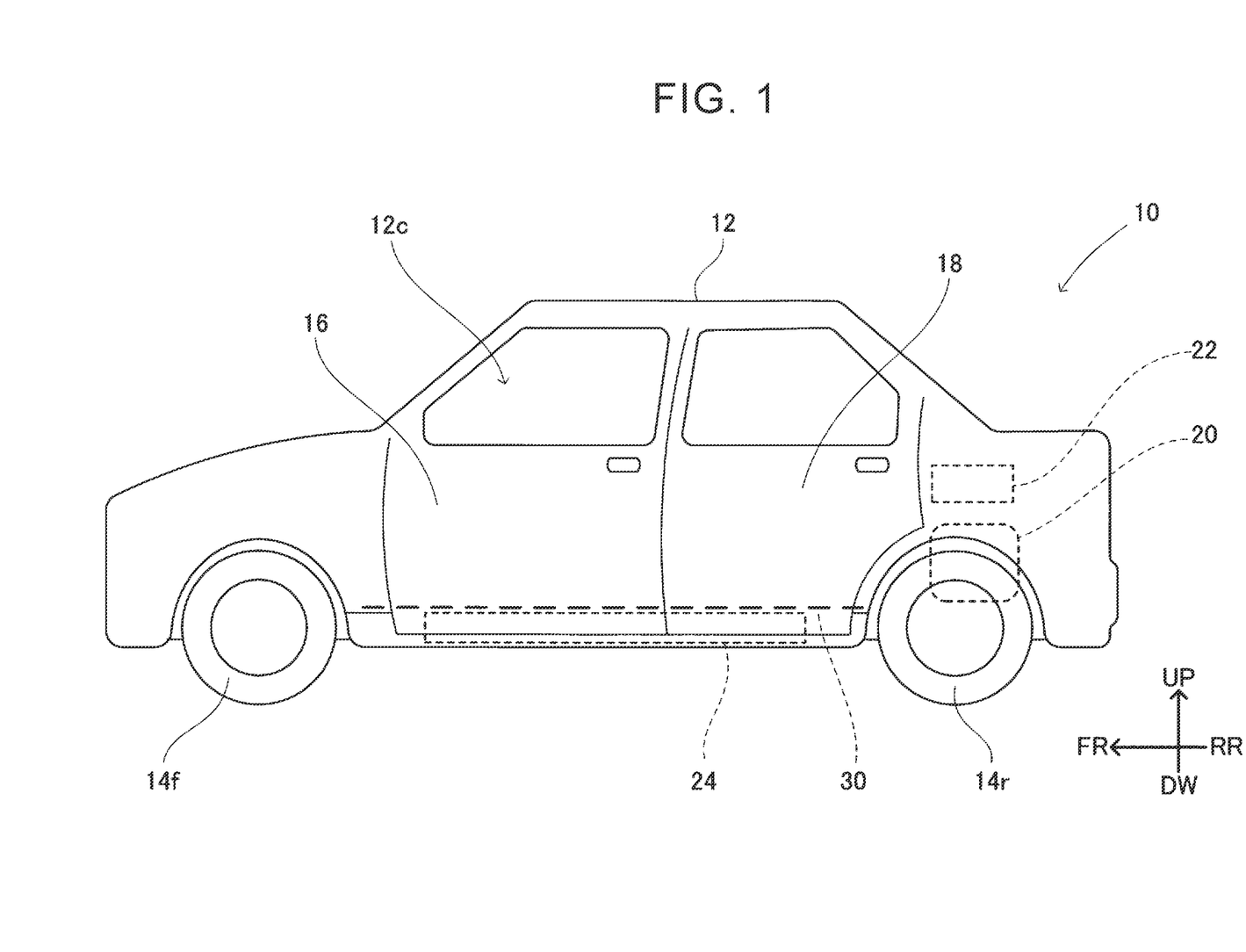
FIG. 1 schematically illustrates a vehicle 10 according to an embodiment.

As illustrated in FIG. 1, the vehicle 10 includes a body 12, a plurality of side doors 16 and 18, and a plurality of wheels 14f and 14r. The body 12 is primarily made of metal, although not limited thereto in particular. A cabin 12c is provided within the body 12. The cabin 12c is configured to enable one or more users to ride therein. A floor panel 30 of the body 12 extends below the cabin 12c. As another embodiment, the vehicle 10 may be an unmanned vehicle with no cabin 12c. In this case, the vehicle 10 may be provided with a luggage compartment above the floor panel 30 instead of the cabin 12c.

The side doors 16 and 18 are located on the side face of the body 12 and are attached to the body 12 so as to be openable and closable. Users can enter and exit the cabin 12c by opening the side doors 16 and 18. The side doors 16 and 18 include a front side door 16 and a rear side door 18 located rearward from the front side door 16, although not limited thereto in particular. These two side doors 16 and 18 are provided not only on the left-side face of the body 12 illustrated in FIG. 1 but also on the right-side face of the body 12. The side doors 16 and 18 in the present embodiment are hinged doors that swing along the horizontal direction. However, in other embodiments, the side doors 16 and 18 may be other types of doors, such as sliding doors, gull-wing doors, or butterfly doors, for example.

Each of the wheels 14f and 14r is rotatably supported by the body 12. The wheels 14f and 14r include a pair of front wheels 14f located at a front portion of the body 12, and a pair of rear wheels 14r located at a rear portion of the body 12. The front wheels 14f are disposed coaxially with each other, and the rear wheels 14r are also disposed coaxially with each other. The front wheels 14f are steering wheels, of which the directions of the axes of rotation change in accordance with user operations. The rear wheels 14r are mechanically connected to an electric motor 20, as described below. Note that the number of wheels 14f and 14r is not limited to four.

The vehicle 10 further includes the motor 20, a power control unit 22, and a battery unit 24. The motor 20 is a traction motor that drives the rear wheels 14r, and is mechanically connected to the rear wheels 14r. The battery unit 24 is a power supply device that supplies electric power to the motor 20, and is electrically connected to the motor 20 via the power control unit 22. The battery unit 24 has a plurality of secondary battery cells built in, and is configured to be repeatedly rechargeable by external power or by regenerative power of the motor 20. The battery unit 24 is located below the floor panel 30 and is disposed following the floor panel 30. The power control unit 22 has a built-in direct current (DC)-DC converter and/or an inverter, which controls the drive power supplied from the battery unit 24 to the motor 20 or the regenerative power supplied from the motor 20 to the battery unit 24, in accordance with to driving operations performed by the user, for example.

Note that the motor 20 is not limited to driving the rear wheels 14r, and it is sufficient for the motor 20 to be configured to drive at least one of the wheels 14f and 14r. The vehicle 10 may further include another prime mover, such as an internal combustion engine for example, in place of or in addition to the motor 20. Also, the vehicle 10 may include other power supply devices such as a fuel cell unit or a solar cell panel, in addition to or in place of the battery unit 24. The vehicle 10 is not limited to a battery electric vehicle that is described here, and may be a hybrid electric vehicle, a fuel cell electric vehicle, a solar car, or the like. Also, the vehicle 10 according to the present embodiment is not limited to vehicles driven by a user, and also includes vehicles operated by external devices, and the vehicle 10 that is autonomously driven.

Figure 2:
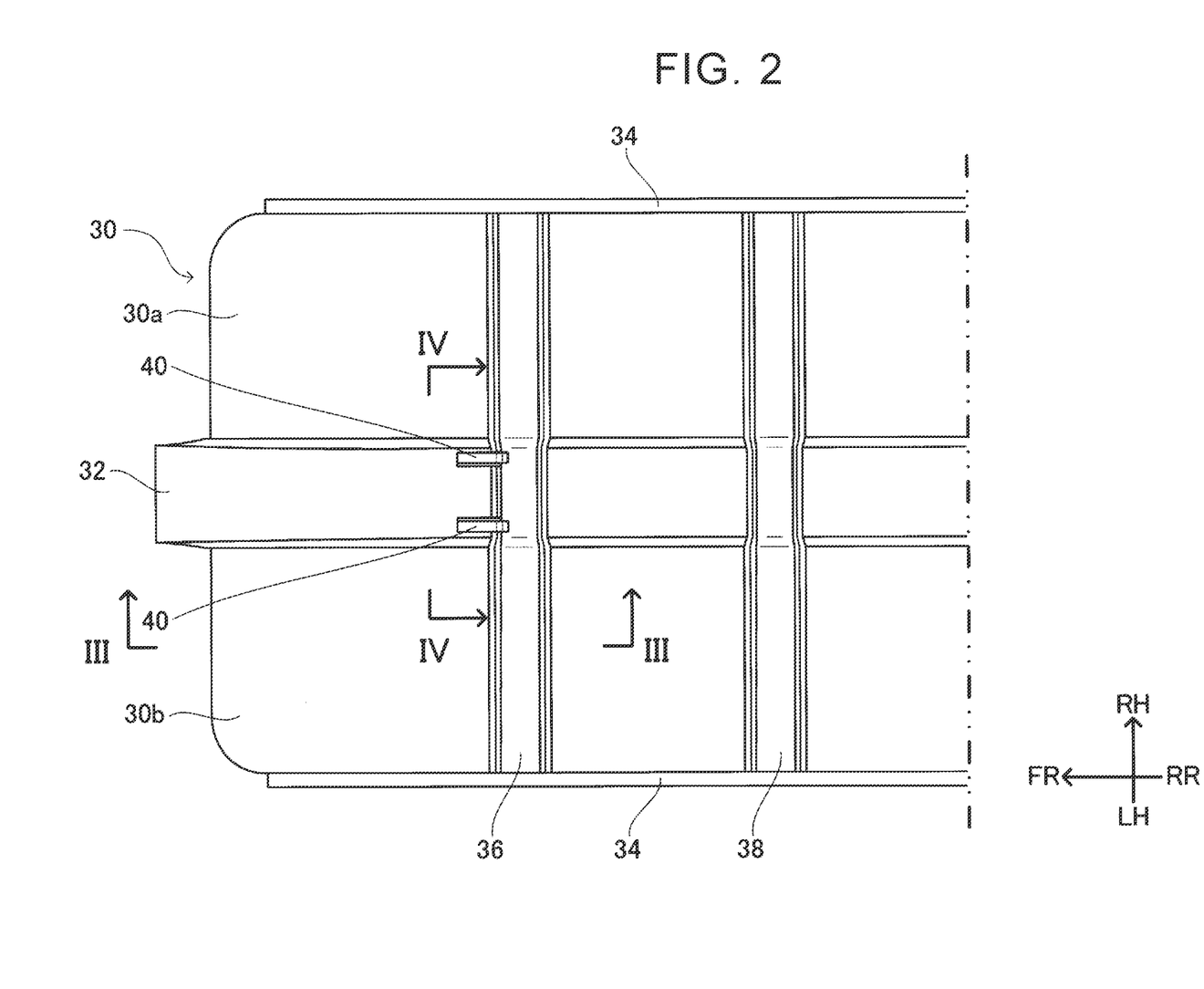
FIG. 2 is a top view illustrating an upper face of a floor panel 30 of a body 12.

As illustrated in FIG. 2, the body 12 includes a center tunnel 32, a pair of the floor panels 30, a pair of rockers 34, and a plurality of floor cross members 36 and 38. The center tunnel 32 protrudes upward, and extends in the front-rear direction of the vehicle 10. The center tunnel 32 is formed of a high tensile strength steel plate, although not limited thereto in particular.

The floor panels 30 extend from the center tunnel 32 toward both sides in the right-left direction. The floor panels 30 include a right-side floor panel 30a extending in the rightward direction from the center tunnel 32 and a left-side floor panel 30b extending in the leftward direction from the center tunnel 32. The right-side floor panel 30a and the left-side floor panel 30b are provided symmetrically to the right and left across the center tunnel 32. The floor panels 30 are formed of high tensile strength steel plates, although not limited thereto in particular.

The rockers 34 are beam-shaped members, and make up a part of the framework of the body 12. The rockers 34 are located on both side edges of the floor panel 30. Specifically, one rocker 34 is provided on the right-side edge of the right-side floor panel 30a. The other rocker 34 is provided on the left-side edge of the left-side floor panel 30b. The rockers 34 extend in the front-rear direction. The rockers 34 are provided symmetrically to the right and left across the center tunnel 32. The rockers 34 are formed of high tensile strength steel plates, although not limited thereto in particular.

The floor cross members 36 and 38 straddle the center tunnel 32 and extend in the right-left direction between the rockers 34. The floor cross members 36 and 38 are rib-shaped members that protrude in the upward direction. The floor cross members 36 and 38 are provided on the upper face of the floor panel 30. The floor cross members 36 and 38 include a first floor cross member 36 located at a forward position, and a second floor cross member 38 located rearward from the first floor cross member 36. The floor cross members 36 and 38 are disposed in parallel. The floor cross members 36 and 38 are formed of high tensile strength steel plates, although not limited thereto in particular.

Figure 3:
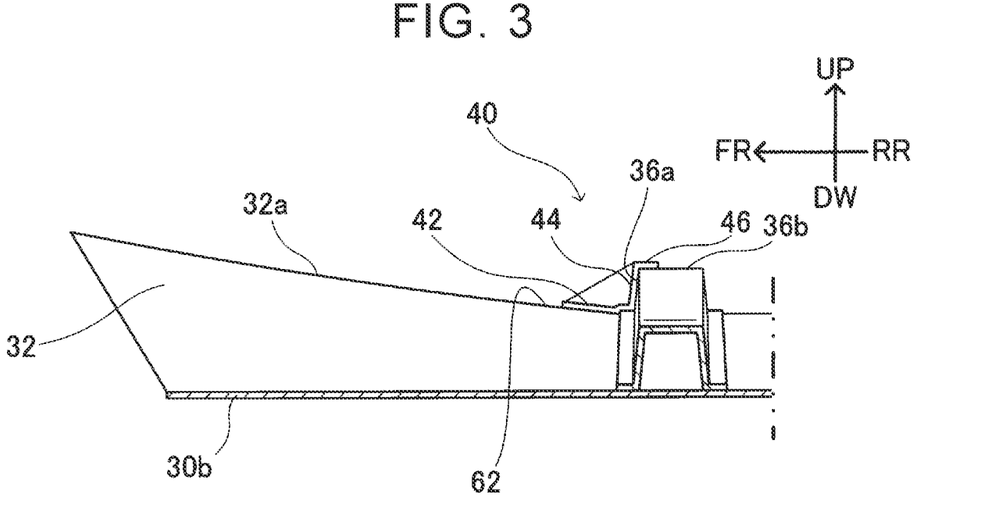
FIG. 3 is a sectional view taken along line III-III in FIG. 2.
Figure 4:
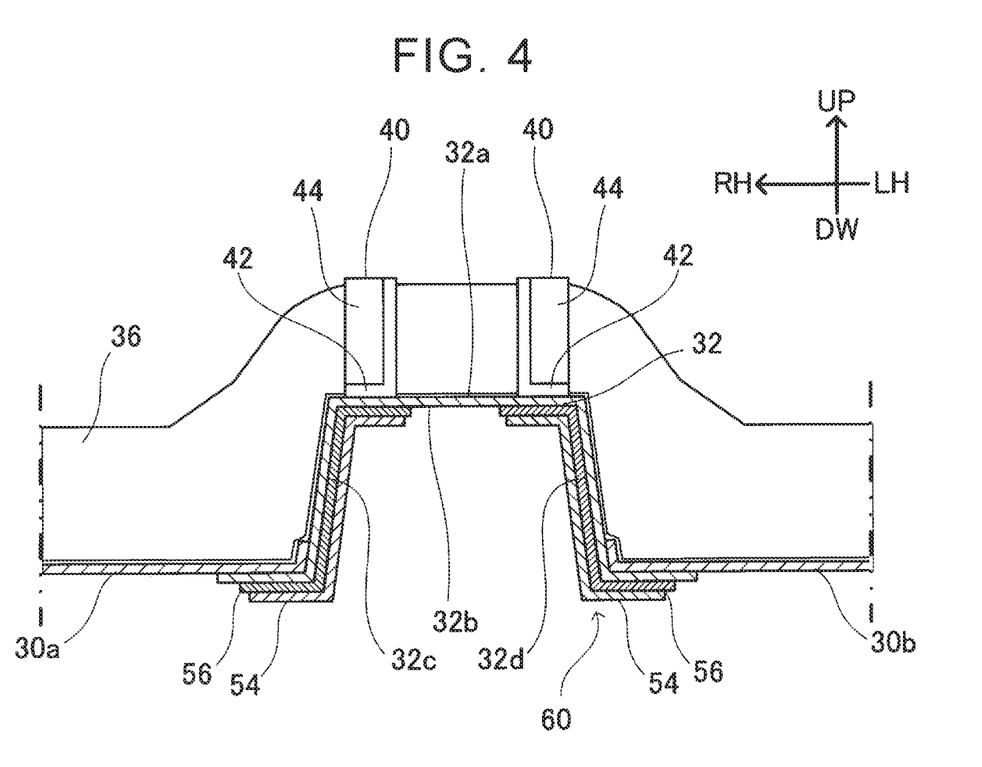
FIG. 4 is a cross-sectional view taken along line IV-IV in FIG. 2.

As illustrated in FIGS. 2, 3, and 4, the body 12 further includes a plurality of reinforcing members 40. The reinforcing members 40 are joined to an upper face 32a of the center tunnel 32 and a front face 36a of the first floor cross member 36. The reinforcing members 40 according to the present embodiment are plate-shaped members and are disposed substantially perpendicular to the right-left direction, although not limited thereto in particular. One side 42 of each reinforcing member 40 is joined to the upper face 32a of the center tunnel 32. Another side 44 of each reinforcing member 40 is joined to the front face 36a of the first floor cross member 36. Note that a part 46 of each reinforcing member 40 extends to an upper face 36b of the first floor cross member 36, and is joined to the upper face 36b. The reinforcing members 40 function as braces (bracing) that connect the upper face 32a joined to one side 42 and the front face 36a joined to the other side 44 to each other, and suppress relative displacement or deformation between the one side 42 and the other side 44. The number of the reinforcing members 40 is not limited in particular, and may be one, or may be three or more. Further, the material making up the reinforcing members 40 may be metal, for example, and may be the same as the material making up the center tunnel 32 or the first floor cross member 36, although not limited thereto in particular. Alternatively, the material making up the reinforcing members 40 may be a material having a higher yield strength than the material making up the center tunnel 32 or the first floor cross member 36.

As described above, in the body 12 of the vehicle 10 according to the present embodiment, the reinforcing members 40 are joined to the upper face 32a of the center tunnel 32 and the front face 36a of the first floor cross member 36. According to such a configuration, a collision load applied to the center tunnel 32 in a frontal collision is dispersed to the first floor cross member 36 through the reinforcing members 40. Thus, the collision load applied to the center tunnel 32 is reduced. Accordingly, bending deformation of the center tunnel 32 around the lateral axis, with the joining position between the upper face 32a of the center tunnel 32 and the front face 36a of the first floor cross member 36 as a starting point, can be suppressed.

Figure 5:
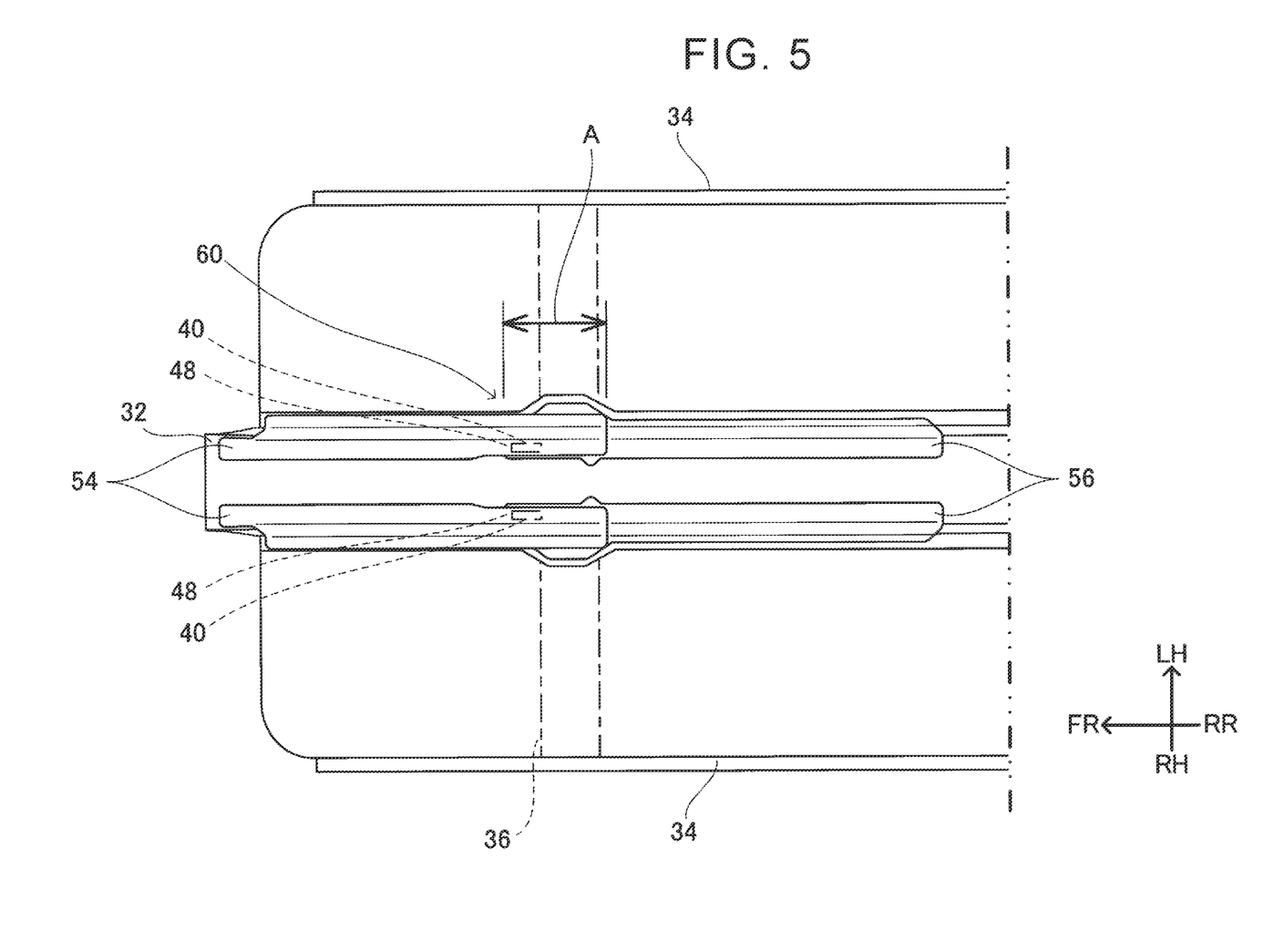
FIG. 5 is a bottom view illustrating lower faces (an upper-side portion 32b, a right-side portion 32c, and a left-side portion 32d) of a center tunnel 32 of the body 12.

As illustrated in FIGS. 4 and 5, the body 12 according to the present embodiment further is provided with tunnel reinforcements (hereinafter referred to as "RF") 54 and 56. The RFs 54 and 56 extend in the front-rear direction of the vehicle 10. As illustrated in FIG. 4, the RFs 54 and 56 are provided on the lower faces (an upper-side portion 32b, a right-side portion 32c, and a left-side portion 32d) of the center tunnel 32. That is to say, the RFs 54 and 56 extend in the front-rear direction along the lower faces (the upper-side portion 32b, the right-side portion 32c, and the left-side portion 32d) of the center tunnel 32. According to such a configuration, the front end of the center tunnel 32 is suppressed from being deformed in the upward direction, that is, a crease is suppressed from being formed downwards. Accordingly, the bending rigidity of the center tunnel 32 around the lateral axis is improved, and bending deformation of the center tunnel 32 due to the collision load can be suppressed even more effectively.

As illustrated in FIG. 5, the RFs 54 and 56 according to the present embodiment are made up of a plurality of members, and are provided with a front tunnel reinforcement (hereinafter referred to as "forward RF") 54 and a rear tunnel reinforcement (hereinafter referred to as "rearward RF") 56. The forward RF 54 is located at a position forward from the rearward RF 56, and a rearward end portion of the forward RF 54 overlaps a forward end portion of the rearward RF 56. The forward RF 54 and the rearward RF 56 are each made up of a pair of right and left members. As illustrated in FIG. 4, one member making up the forward RF 54 is provided over the upper-side portion 32b and the right-side portion 32c of the center tunnel 32, out of the lower faces (the upper-side portion 32b, the right-side portion 32c, and the left-side portion 32d). The other member making up the forward RF 54 is provided over the upper-side portion 32b and the left-side portion 32d of the center tunnel 32, out of the lower faces (the upper-side portion 32b, the right-side portion 32c, and the left-side portion 32d). Similarly, one member making up the rearward RF 56 is provided over the upper-side portion 32b and the right-side portion 32c, and the other member making up the rearward RF 56 is provided over the upper-side portion 32b and the left-side portion 32d.

As illustrated in FIG. 5, the forward RF 54 and the rearward RF 56 are provided with an overlap portion 60 overlapping each other in the range indicated by an arrow A. In the overlap portion 60, the RFs 54 and 56 are overlaid in the order of the rearward RF 56 and the forward RF 54, from the upward direction of the vehicle 10, although not limited thereto in particular. The overlap portion 60 between the forward RF 54 and the rearward RF 56 is located below the first floor cross member 36. According to such a configuration, the rigidity of the joining position of the upper face 32a of the center tunnel 32 and the front face 36a of the first floor cross member 36, which can be the starting point of bending deformation of the center tunnel 32, is selectively increased. Accordingly, bending deformation of the center tunnel 32 can be suppressed even more effectively. Note that the order in which the rearward RF 56 and the forward RF 54 are overlaid is not limited in particular.

In addition, front ends 48 of the reinforcing members 40 face the overlap portion 60 at respective positions across the center tunnel 32. According to such a configuration, a collision load applied to the center tunnel 32 can be dispersed to the first floor cross member 36 through the overlap portion 60, before being dispersed to the first floor cross member 36 through the reinforcing member 40. Also, the positions of the front ends 48 of the reinforcing members 40 can be suppressed from becoming the starting point of bending deformation of the center tunnel 32. Accordingly, bending deformation of the center tunnel 32 can be suppressed even more effectively.

The forward RF 54 is formed from a hot stamping material. Hot stamping material is a high-strength pressing material, and is generally also referred to as boron steel or press hardened steel (PHS). The rearward RF is formed of a high tensile strength steel plate. Accordingly, the material making up the forward RF 54 has higher rigidity than the material making up the rearward RF 56. By dividing the tunnel reinforcement into the forward RF 54 and the rearward RF 56, each of the RFs 54 and 56 can be provided with rigidity necessary thereto. In particular, by increasing the rigidity of the forward RF 54, bending deformation of the center tunnel 32 due to a collision load from the forward direction can be effectively suppressed. In a modification, the materials making up the forward RF 54 and the rearward RF 56 may be the same. In this case, it is sufficient for the forward RF 54 to have a higher rigidity than the rearward RF 56, with consideration given to the shape.

Also, the material making up the forward RF 54 has higher yield strength than the material making up the rearward RF 56. According to such a configuration, the yield strength in bending deformation around the lateral axis of the forward RF 54 is improved, and the bending deformation of the center tunnel 32 can be suppressed even more effectively. On the other hand, by adopting a material having a relatively low yield strength as the material making up the rearward RF 56, for example, the labor and costs for manufacturing the vehicle 10 can be reduced.

As described above, the center tunnel 32 is formed of a high-strength material such as a high tensile strength steel plate. That is to say, the forward RF 54 has a higher yield strength than the material making up the center tunnel 32. With such a configuration, the yield strength of the center tunnel 32 can be increased against bending deformation around the lateral axis. In particular, selectively adopting a material having a high yield strength for the forward RF, rather than to the entire center tunnel 32, enables the yield strength of the center tunnel 32 to be effectively improved in the range in which bending deformation is expected.

As illustrated in FIG. 3, in the body 12 according to the present embodiment, the range of the upper face 32a of the center tunnel 32 located above at least the first floor cross member 36 is an inclined face 62 inclined downward from forward to rearward. In an arrangement in which the range of the upper face 32a of the center tunnel 32 that intersects with the first floor cross member 36 is the inclined face 62, when a collision load due to the frontal collision is applied to the center tunnel 32, the front end of the center tunnel 32 readily exhibits bending deformation in the upward direction with this intersecting range as the starting point. With regard to this point, the reinforcing member 40 in the present embodiment is joined to the inclined face 62 in particular, at the upper face 32a of the center tunnel 32. According to such a configuration, bending deformation of the center tunnel 32 can be effectively suppressed even when the upper face 32a of the center tunnel 32 is inclined.

Although an embodiment of the present technology has been described in detail above, the embodiment is merely exemplary and is not intended to limit the scope of the claims. The technology in the present disclosure includes various modifications and alternations of the specific examples illustrated above. The technical elements described in the present specification and the drawings have technical utility alone or in various combinations, and are not limited to the combinations described in the claims at the time of filing. The technology exemplified in the present specification or in the drawings may achieve a plurality of objects at the same time, and has technical utility by achieving one of the objects by itself.

What is claimed is:

1. A body of a vehicle, the body comprising:
   a center tunnel that extends in a front-rear direction of the vehicle;
   a floor panel that extends from the center tunnel to both sides of the vehicle in a right-left direction;
   a floor cross member that is provided on an upper face of the floor panel and that extends in the right-left direction of the vehicle, straddling the center tunnel;
   a reinforcing member joined to an upper face of the center tunnel and to a front face of the floor cross member;
   a forward tunnel reinforcement that extends in the front-rear direction of the vehicle and that is provided on a lower face of the center tunnel;
   a rearward tunnel reinforcement that extends in the front-rear direction of the vehicle and that is provided on the lower face of the center tunnel, the rearward tunnel reinforcement located rearward from the forward tunnel reinforcement; and
   an overlap portion in which the forward tunnel reinforcement and the rearward tunnel reinforcement overlap each other, the overlap portion provided downward from the floor cross member.

2. The body according to claim 1, wherein the reinforcing member is a plate-shaped member that is joined to the upper face of the center tunnel on a first side of the reinforcing member and is joined to the front face of the floor cross member on a second side of the reinforcing member.

3. The body according to claim 1,
   wherein, of the upper face of the center tunnel, at least a range located above the floor cross member is an inclined face that inclines downward from forward to rearward, and
   wherein the reinforcing member is joined to the inclined face of the center tunnel.

4. The body according to claim 1, wherein a front end of the reinforcing member faces the overlap portion on either side of the center tunnel.

5. The body according to 1, wherein a rigidity of the forward tunnel reinforcement is higher than a rigidity of the rearward tunnel reinforcement.

6. The body according to claim 5, wherein a yield strength of a material making up the forward tunnel reinforcement is higher than a yield strength of a material making up the rearward tunnel reinforcement.

7. The body according to 1, wherein a yield strength of a material making up the forward tunnel reinforcement is higher than a yield strength of a material making up the center tunnel.

\* \* \* \* \*